(12) United States Patent
Konstad et al.

(10) Patent No.: US 7,242,300 B1
(45) Date of Patent: Jul. 10, 2007

(54) SHOPPING CART

(75) Inventors: Rolf A. Konstad, Gold River, CA (US); Jeffery W. Lawrence, Shingle Springs, CA (US)

(73) Assignee: Evolution Robotics Retail, Inc., Pasadena, CA (US)

( * ) Notice: Subject to any disclaimer, the term of this patent is extended or adjusted under 35 U.S.C. 154(b) by 0 days.

(21) Appl. No.: 11/209,501

(22) Filed: Aug. 23, 2005

Related U.S. Application Data (60) Provisional application No. 60/604,808, filed on Aug. 27, 2004, provisional application No. 60/642,556, filed on Jan. 11, 2005.

(51) Int. Cl.
*G08B 13/14* (2006.01)
(52) U.S. Cl. .............................. 340/568.5; 280/33.992
(58) Field of Classification Search ........... 280/33.992; 177/15, 17, 25.11, 25.15; 340/568.5, 666, 340/870.07; 705/16, 400, 414
See application file for complete search history.

(56) References Cited

U.S. PATENT DOCUMENTS

| 3,051,936 | A | * | 8/1962 | Finger et al. ............. 340/568.5 |
| 3,263,774 | A | * | 8/1966 | Reese ........................... 186/62 |
| 3,457,423 | A | * | 7/1969 | Gravely .................. 250/223 R |
| 3,725,894 | A | * | 4/1973 | Geisler ..................... 340/568.5 |
| 4,327,819 | A | * | 5/1982 | Coutta .......................... 186/62 |
| 4,723,118 | A | * | 2/1988 | Hooley et al. ........... 340/568.5 |
| 4,725,822 | A | * | 2/1988 | Hooley ..................... 340/568.5 |
| 4,736,098 | A | * | 4/1988 | Rehrig ...................... 250/222.1 |
| 5,485,006 | A | * | 1/1996 | Allen et al. .............. 250/222.1 |
| 5,495,102 | A | * | 2/1996 | Fine ......................... 250/222.1 |
| 5,500,526 | A | | 3/1996 | Shalvi et al. |
| 5,610,584 | A | * | 3/1997 | Schrade ................... 340/568.5 |
| 5,646,616 | A | | 7/1997 | Komatsu |
| 5,883,968 | A | * | 3/1999 | Welch et al. ............... 382/100 |
| 5,910,769 | A | | 6/1999 | Geisler |
| 6,542,079 | B1 | * | 4/2003 | Kahl, Sr. ................. 340/568.5 |
| 6,724,206 | B2 | * | 4/2004 | Arakawa et al. ........... 324/755 |
| 6,725,206 | B1 | | 4/2004 | Coveley |
| 6,741,177 | B2 | * | 5/2004 | Ballantyne ............... 340/568.5 |
| 6,775,588 | B1 | | 8/2004 | Peck |
| 2003/0184440 | A1 | * | 10/2003 | Ballantyne ............... 340/568.5 |
| 2004/0199427 | A1 | * | 10/2004 | van der Loo ................. 705/16 |
| 2005/0189412 | A1 | * | 9/2005 | Hudnut et al. .............. 235/383 |
| 2006/0032914 | A1 | * | 2/2006 | Brewster et al. ............ 235/383 |

OTHER PUBLICATIONS

Transponder News "Is it Possible to Scan a Supermarket Trolley Using RFIP?" by Mike Marsh May 13, 2005 http://rapidtp.com/transponder/trolposs.

* cited by examiner

*Primary Examiner*—J. Allen Shriver

(57) ABSTRACT

The present invention teaches and discloses method and apparatus for alerting a grocery store check out cashier of merchandise placed on the bottom tray of a typical grocery shopping cart. A passive RFID transponder is incorporated into the structure of the cart which when interrogated by an associated reader, located at the cashier's check out station, responds with a signal verifying the presence, or absence, of an unseen item upon the carts bottom tray.

3 Claims, 10 Drawing Sheets

SHOPPING CART

RELATED APPLICATIONS

This application claims the priority of Provisional Patent Application Ser. No. 60/604,808 filed on Aug. 27, 2004 Titled "Bob Sensor System" and Provisional Patent Application Ser. No. 60/642,556 filed on Jan. 11, 2005 Titled "Object Sensing System."

FIELD OF THE INVENTION

The present invention generally relates to Radio Frequency Identification (RFID) technology. More specifically the present invention relates to using RFID technology to detect the presence of merchandise placed upon the bottom tray or rack of a typical grocery shopping cart by a consumer

BACKGROUND OF THE INVENTION

A typical grocery shopping cart as used in grocery stores comprises a base frame, supporting wheels and a bottom rack or tray for carrying large bulky purchases such as bags of dog food and the like, an upper basket extending over top of the bottom tray, and a handle bar for pushing the cart about the store.

When the top basket is relatively full, items placed upon the bottom tray are, many times, hidden from view and may go unnoticed by the check out cashier.

Thus an effective means is needed to detect items, placed on the bottom tray of a grocery shopping cart, that may be hidden from view of the check out cashier.

BRIEF DESCRIPTION OF THE INVENTION

The present invention teaches an improved method and apparatus for the detection of articles of purchase placed upon the lower shelf or tray of a typical grocery shopping cart at the check-out cashier's station that otherwise may go unnoticed.

Our invention comprises a weight sensing grocery cart, bottom tray, employing a passive RFID transponder module that will respond to an interrogating RFID signal, as the grocery cart is passed through a grocery cart check out station, when a product is present upon the grocery cart bottom tray.

Products placed upon the grocery cart's bottom tray are detected by a logic sensing radio frequency microchip and antenna incorporated into the bottom tray. A radio frequency identification transmitter/receiver with an antenna is located in the check out station area and coupled to an alert warning device located in proximity of the check out cashier, or coupled to an otherwise automated system that alerts the check out cashier to the presence of an unnoticed product on the bottom tray of the grocery cart.

When an item is placed on the grocery cart's bottom tray, the item activates a weight sensing switch mechanism incorporated within the bottom tray. As the tray is passed through the check out station detection area, the radio frequency transmitter/receiver, in the detection area, activates a microchip incorporated into the cart's bottom tray. The microchip then senses the state of the weight sensing switch mechanism within the tray and transmits this information back to the check out station transmitter/receiver. A signal is then sent to an alert device whereby the "operator" is notified of the presence of an item on the bottom tray. The "operator" may be a person, namely a check out cashier, or may be hardware such as a computer or programmable logic controller.

DETAILED DESCRIPTION OF THE INVENTION

Figure 1:
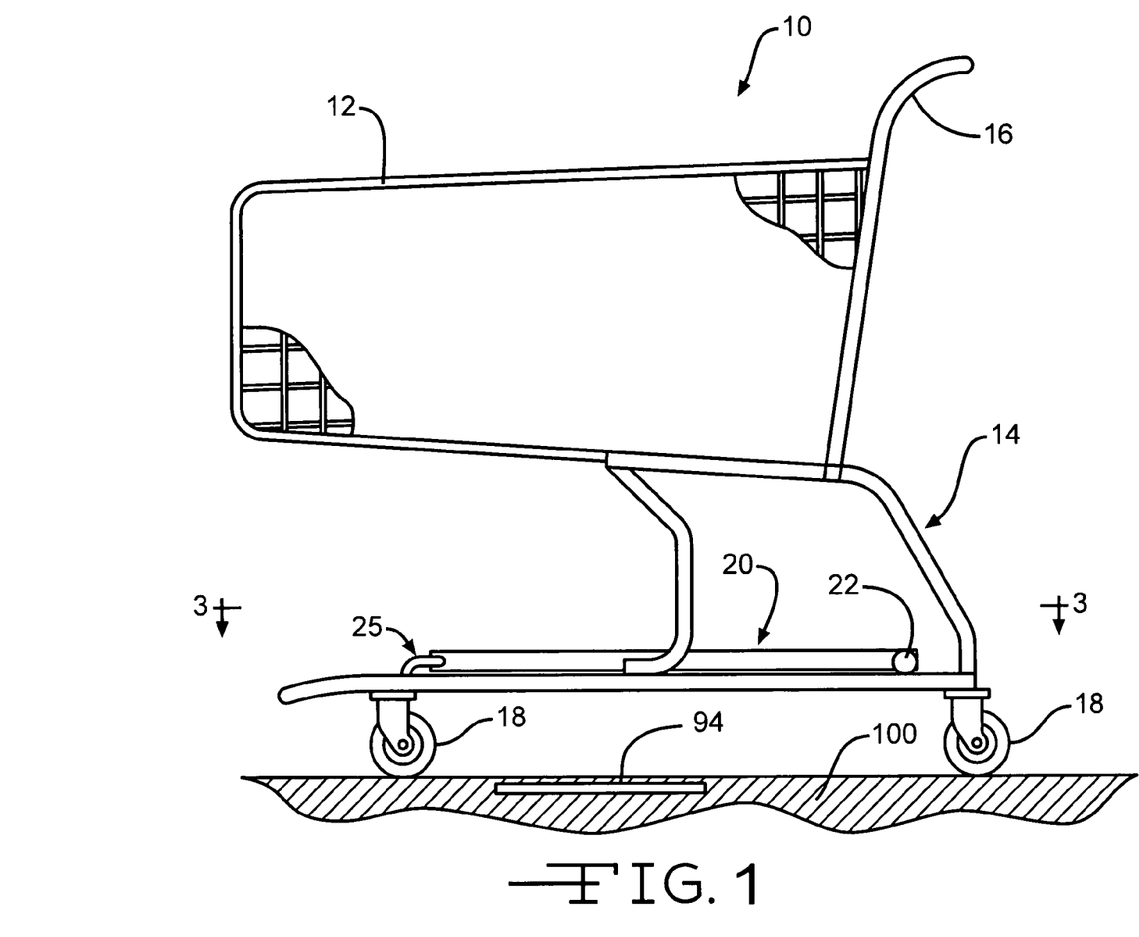
FIG. 1 presents a side elevational view of a typical grocery shopping cart embodying the present invention.

FIG. 1 illustrates a typical grocery store shopping cart 10 commonly used in modern day supermarkets. Shopping cart 10 generally comprises a basket 12 for receiving the shoppers selected purchases, an undercarriage structure assembly 14 for supporting basket 12, and providing a handle 16 for pushing the cart and supporting wheels 18.

Figure 2:
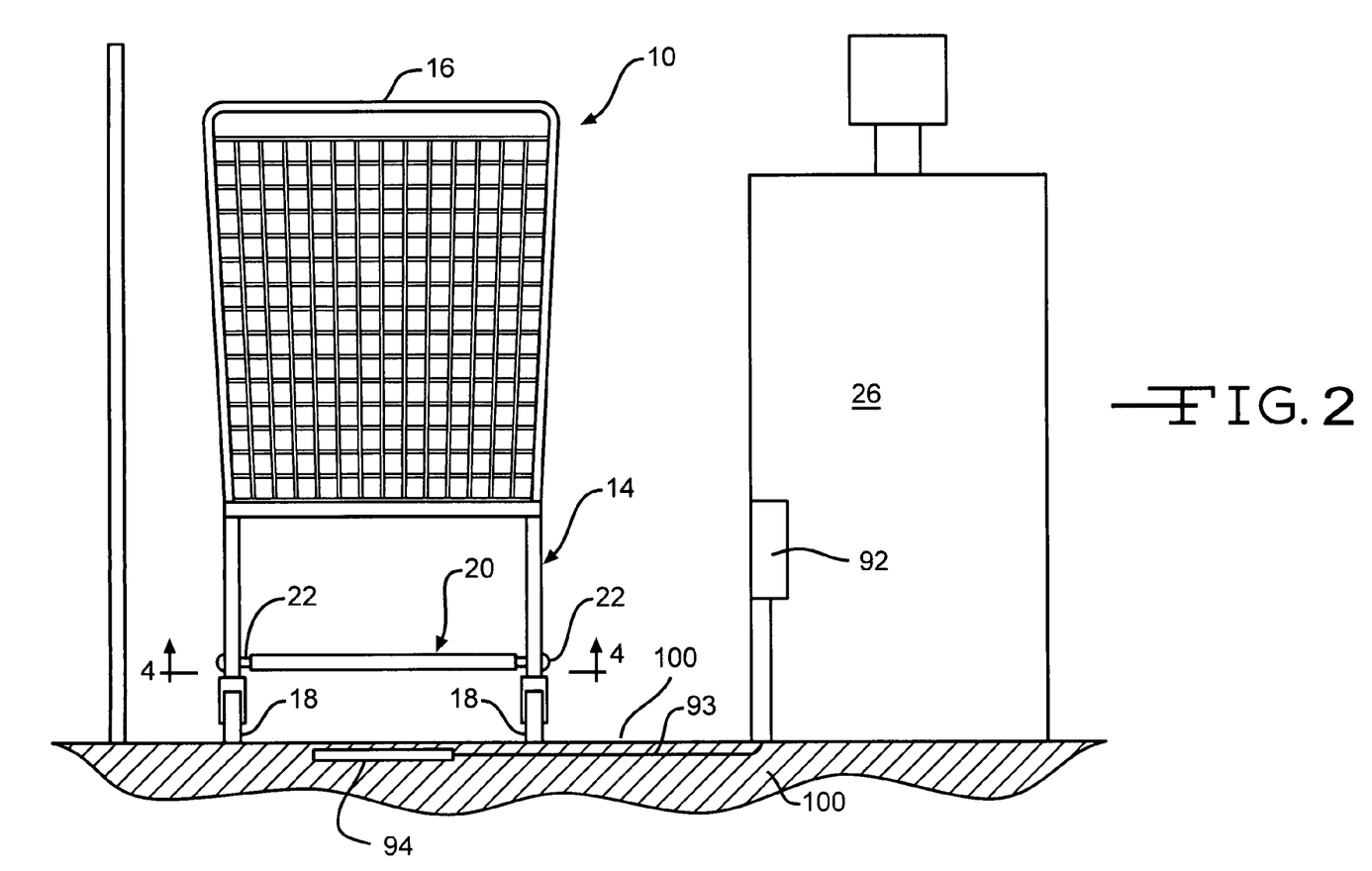
FIG. 2 presents a rear elevational view of the grocery shopping cart in FIG. 1 shown passing through a typical grocery store cashier's check out station.
Figure 3:
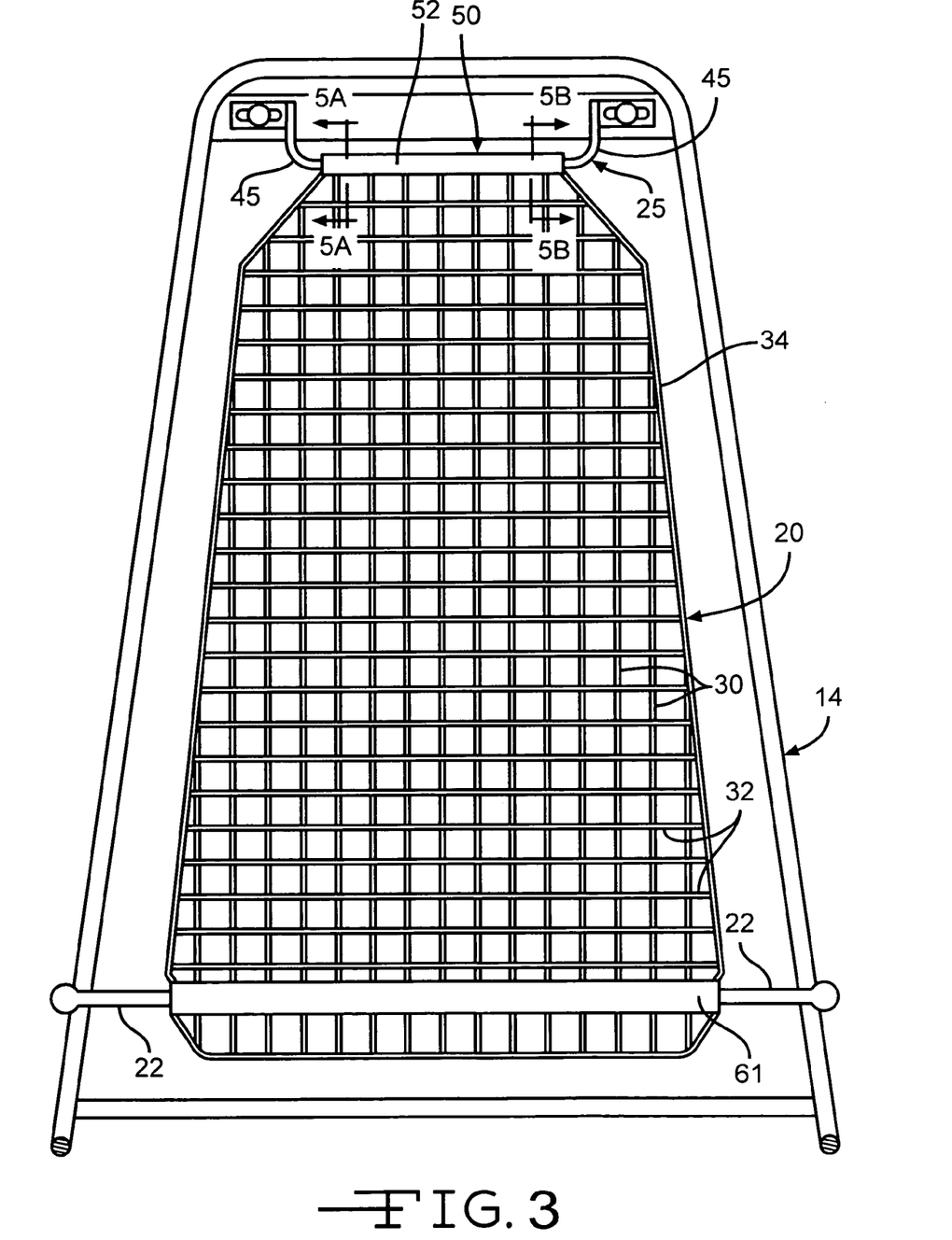
FIG. 3 presents a top view of the lower shelf of the grocery cart shown in FIG. 1 and taken along lines 3—3 in FIG. 1.

As illustrated in FIGS. 1 through 3, a bottom tray assembly 20, supported by undercarriage 14, is typically provided for the placement of large and/or bulky items selected for purchase. In the present embodiment of the invention tray assembly 20 is hingedly supported at the front end of cart 10 by hinged support assembly 25 and at the rear by a laterally extending support bar 22. Hinge support assembly 25 attaches bottom tray 20 to the front end of undercarriage assembly 14 and permits the rear portion of bottom tray 20 to be raised and lowered, thereby permitting the telescopingly storage of carts 10 when not in use. Hinge support assembly 25 also permits bottom tray 20 to "float" vertically as described in further detail below.

Figure 4:
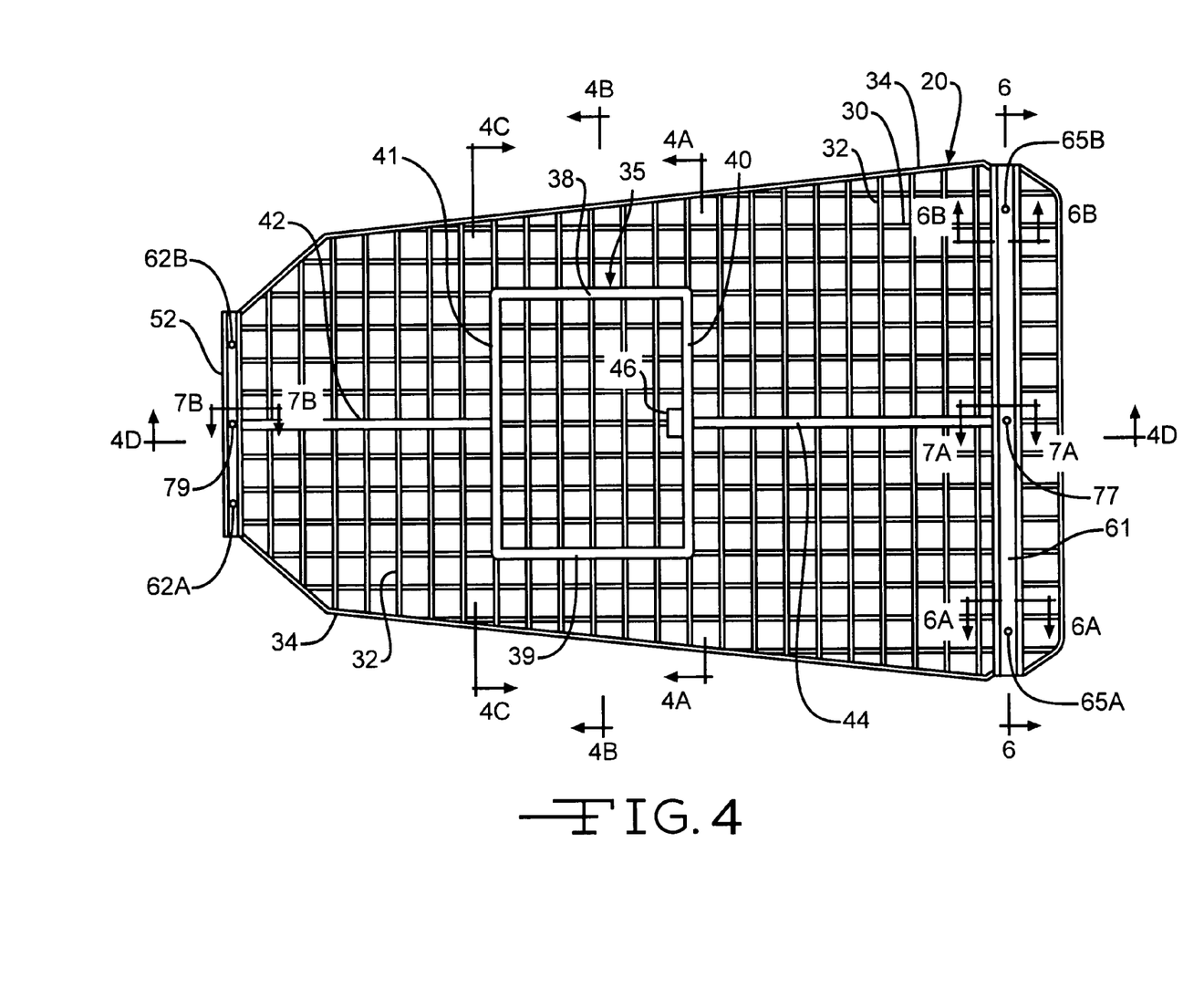
FIG. 4 is a bottom view of the lower shelf of the grocery cart shown in FIG. 1 and taken along lines 4—4 in FIG. 2.
Figure 4A:
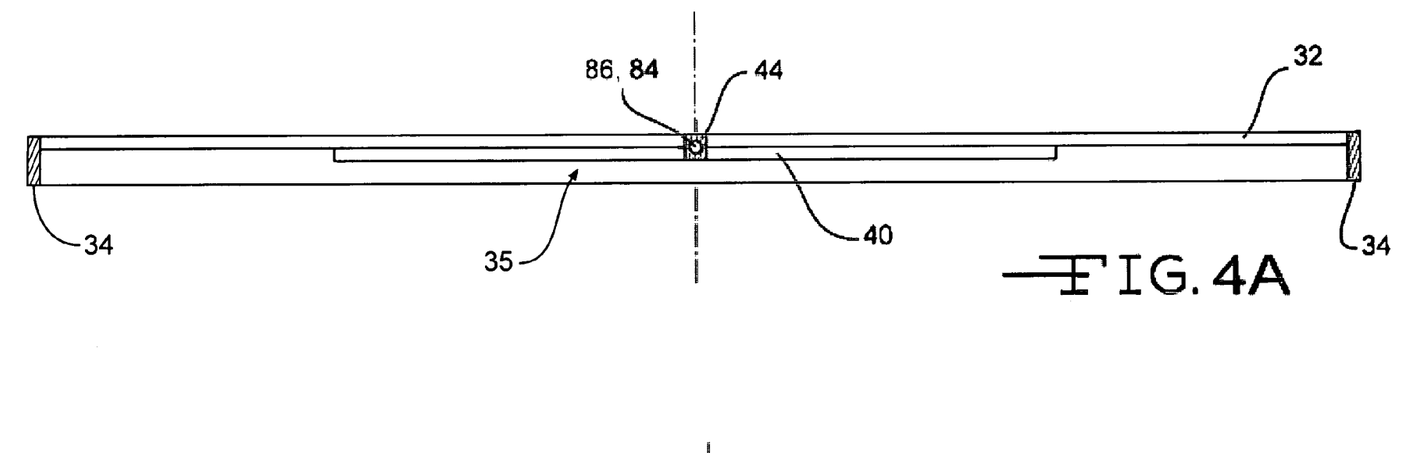
FIG. 4A is a crossectional view taken along line 4A—4A in FIG. 4.
Figure 4B:
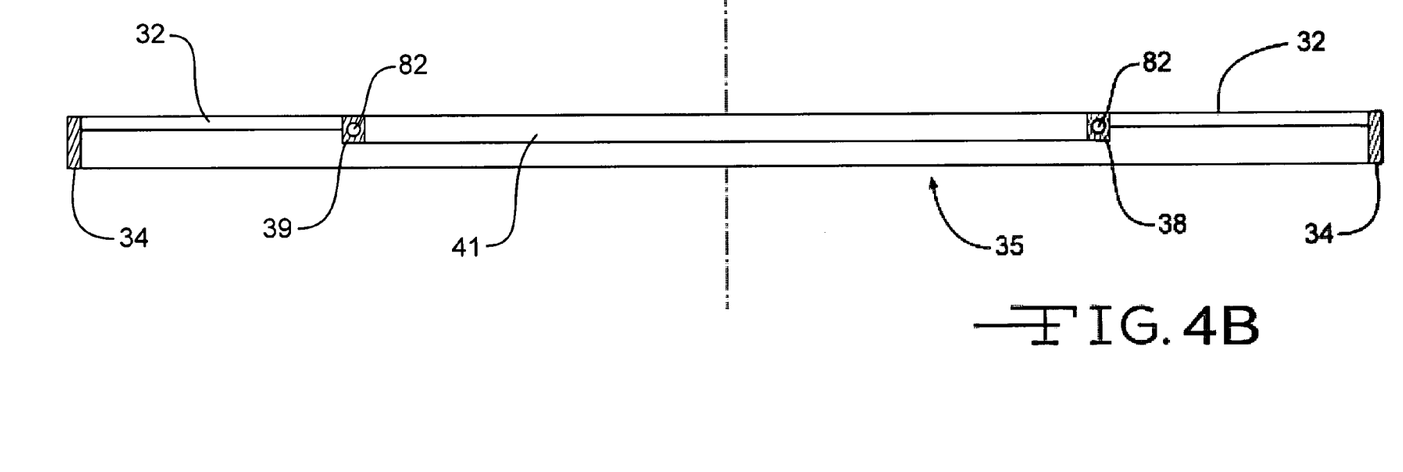
FIG. 4B is a crossectional view taken along line 4B—4B in FIG. 4.
Figure 4C:
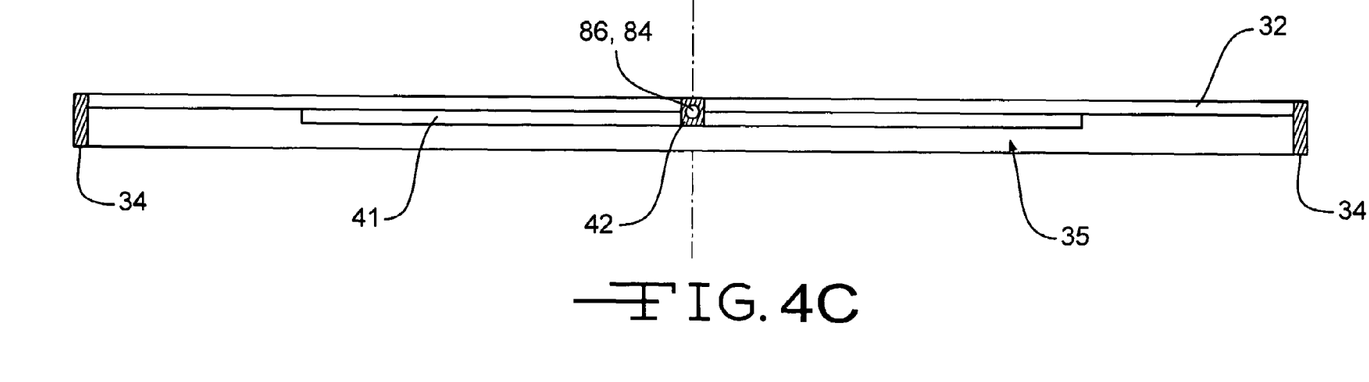
FIG. 4C is a crossectional view taken along line 4C—4C in FIG. 4.
Figure 4D:
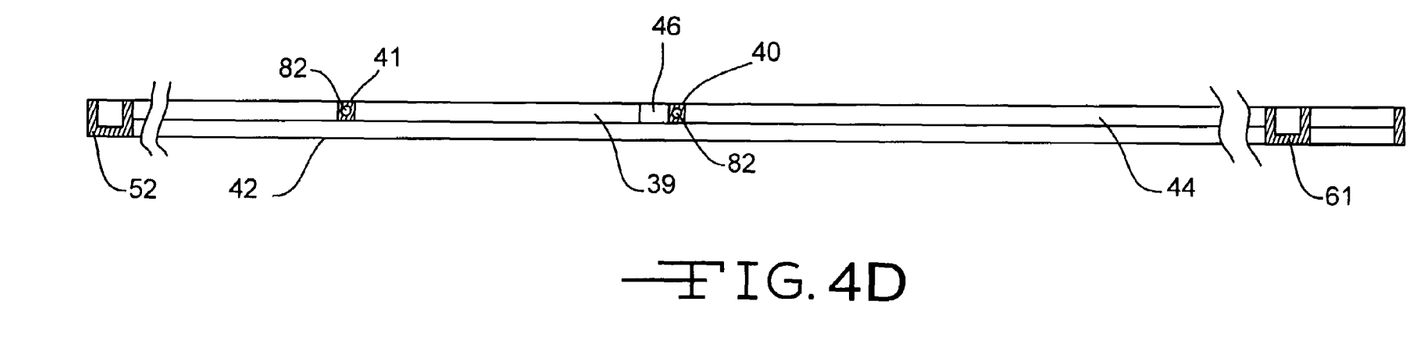
FIG. 4D is a crossectional view taken along line 4D—4D in FIG. 4.

Turning now to FIGS. 4 through 4D, bottom tray assembly 20 primarily comprises a planar grid structure having a multiplicity of longitudinal longerons 30 and laterally intersecting orthogonal members 32 within a surrounding frame 34. Included within the planer grid structure of bottom tray assembly 20 is a planer rectangular structure 35 comprised of enlarged portions of intersecting longerons 38 and 39 and orthogonal members 40 and 41. Extending longitudinally outward from opposite sides of rectangular structure 35 are similarly enlarged longerons 42 and 44 extending forward toward the front end of tray 20 and toward the rear of tray 20 respectively.

Figure 5A:
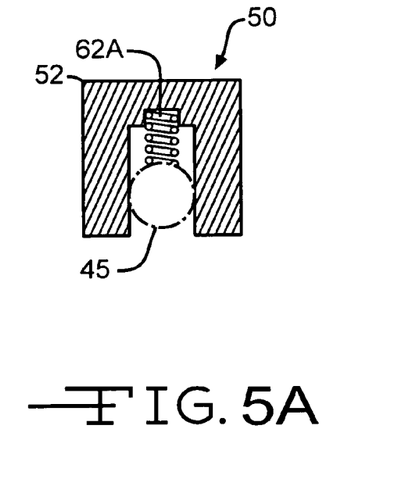
FIG. 5A is a crossectional view taken along line 5A—5A in FIG. 3.
Figure 5B:
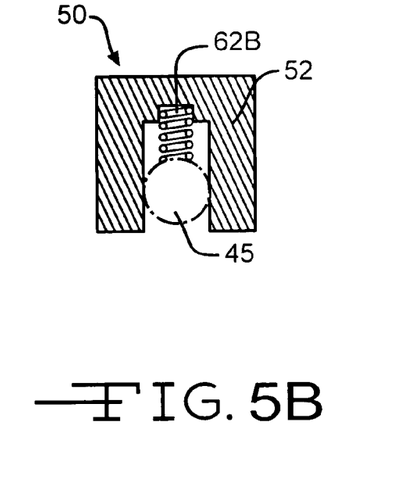
FIG. 5B is a crossectional taken along line 5B—5B in FIG. 3.

Referring now to FIGS. 3, through 5B, the forward portion of surrounding frame 34 includes a "floating" hinge assembly 50 comprising an inverted "U" shaped channel member 52 that engages front end support rod 45. Support rod 45 comprises a single rod extending through the lateral length of hinge assembly 50 and is affixed to cart undercarriage assembly 14 as best illustrated in FIG. 3.

At opposite lateral ends of channel member 52 are vertically aligned compression springs 62A and 62B positioned between support rod 45 and the top of channel member 52 whereby tray assembly 20 floats a predetermined distance above support rod 45 and is also free to rotate about support rod 45 thereby permitting carts to be telescopingly stored when not in use.

Figure 6A:
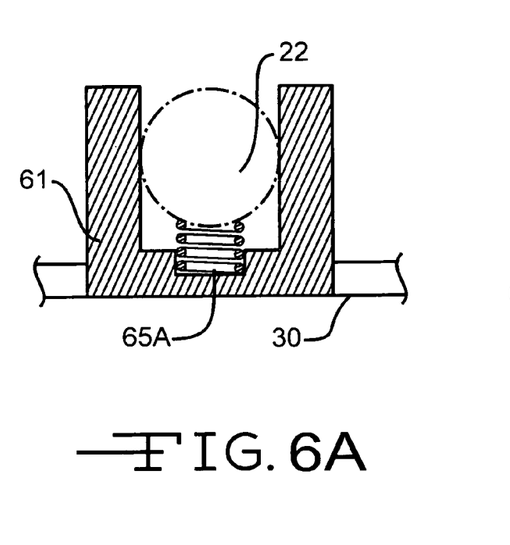
FIG. 6A is a crossectional view taken along line 6A—6A in FIG. 4.
Figure 6B:
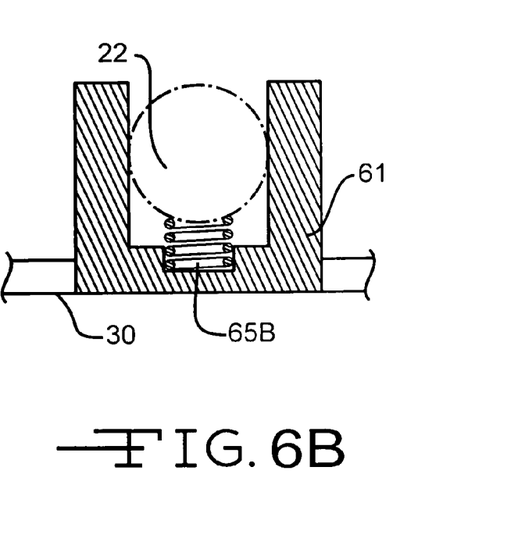
FIG. 6B is a crossectional view taken along line 6B—6B in FIG. 4.

Referring now to FIGS. 3, 4, 6A and 6B. The rear portion of tray 20 includes rear channel support member 61 having rear support bar 22 passing therethrough as best illustrated in FIGS. 6A and 6B. Similar to the forward portion of tray 20, a pair of oppositely positioned, vertically aligned, compression springs 65A and 65B are positioned between rear support bar 22 and the top of rear channel support member 61 as best illustrated in FIGS. 6A and 6B. Compression springs 65A and 65B cause the rear portion of tray 22 to float at a predetermined distance above rear support bar 22.

By the action of compression springs 62A, 62B, 65A and 65B tray 20 floats above forward support rod 45 and rear support bar 22.

Figure 7A:
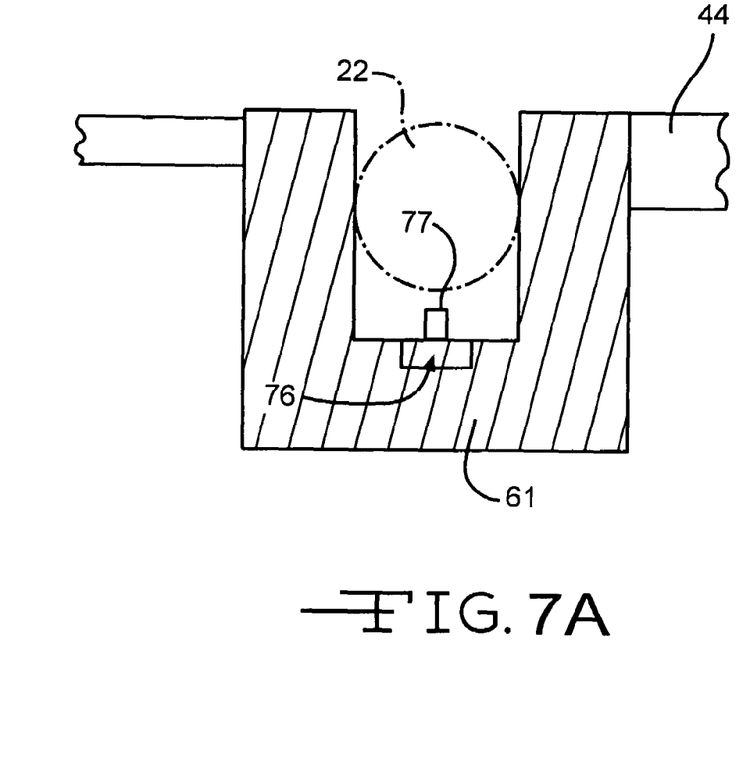
FIG. 7A is a crossectional view taken along line 7A—7A in FIG. 4.
Figure 7B:
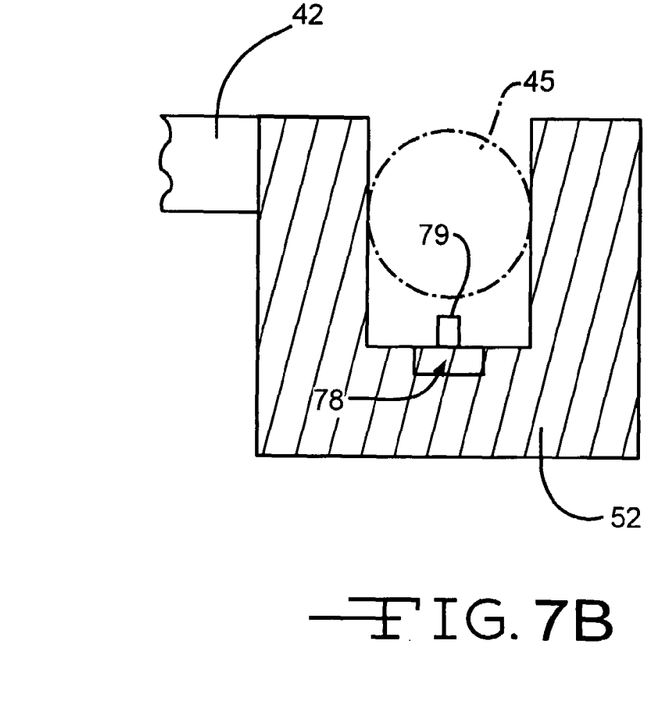
FIG. 7B is a crossectional view taken along line 7B—7B in FIG. 4.

Referring now to FIGS. 4, 7A and 7B. An electrical "on-off" switch assembly 76 and 78 is positioned within rear channel 61 and front channel 52. Switch 76 is positioned above rear support bar 22 and switch 78 is positioned above front support rod 25 as illustrated in FIGS. 7A and 7B. Switches 76 and 78 are simple on/off, single pole/single throw, switches having a suitable plunger type operator 77 and 79 respectively. Although only two on/off switches are illustrated, any number of on/off switches may be used as desired.

In operation, tray 20 is floatingly suspended above front support rod 22 and rear support bar 25 by action of compression springs 62A, 62B, 65A, and 65B such that switches 76 and 78 are in the non-activated (open) configuration. When an object is placed upon tray 20, the appropriate compression spring, or springs 62A, 62B, 65A and/or 65B are compressed whereby at least one of the switches, 76 or 78, is activated (closed) by switch plunger 79 and/or 78 coming into contact with front support rod 45 and/or rear support bar 22.

Figure 8:
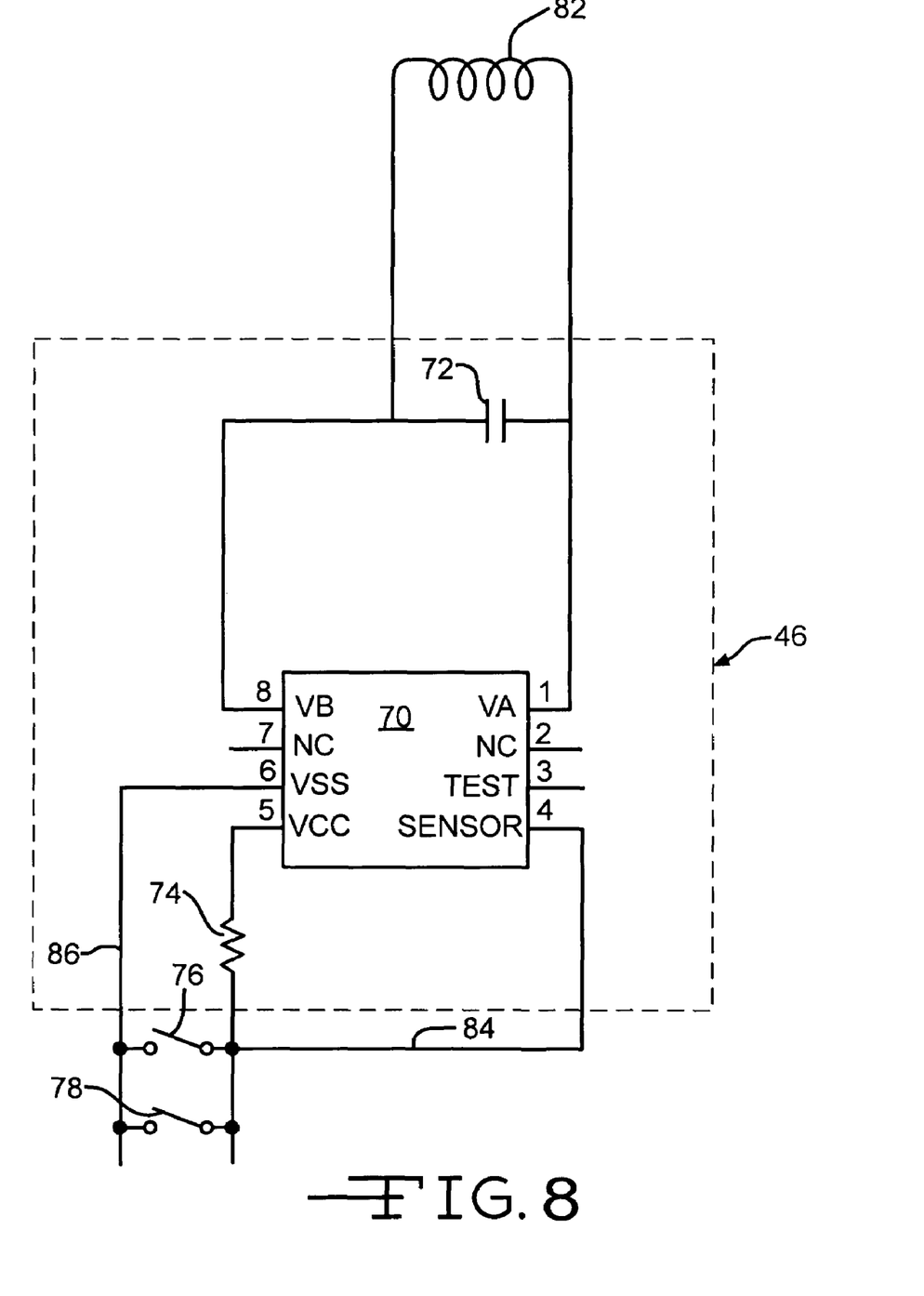
FIG. 8 presents a schematic of the passive transponder circuit on the shopping cart shown in FIG. 1.

Turning now to FIGS. 4 and 8, a passive transponder device is attached to, or otherwise integrated into, enlarged orthogonal members 40, 41, and longerons 38 and 39. Attached to or otherwise integrated therewith, is an onboard transponder microprocessor module 46 having therein microprocessor 70 and associated elements as illustrated in FIG. 8.

The passive transponder circuit comprises antenna 82, capacitor 72, for tuning antenna 82, and one or more weight sensing switches 76 and 78 wired in series with resistor 74 by way of hard wiring 84 and 86 extending through enlarged longerons 42 and 44 as best illustrated in FIGS. 4C and 4A respectively. A suitable microprocessor chip 70 is Microprocessor Model MCRF-202 manufactured by Microchip, Inc., of Chandler, Ariz. Antenna 82 comprises multiple loops of cooper wire embedded within, or otherwise attached to orthogonal members 40 and 41 and longerons 38 and 39 of tray 20 thereby forming a loop antenna. See FIGS. 4B and 4D. Capacitor 72 is arranged in parallel with antenna 82 thereby tuning the natural frequency of the circuit to maximize response at the desired operating frequency within the range of 100 to 400 kHz. Other frequencies may be used, however, the range of 100 to 400 kHz has been found to provide the preferred read range and antenna size.

FIG. 2 illustrates a typical grocery store cashier's check out station 26 embodying the present invention. Contained within check out station 26 is an RFID Inc. Model 5000-1E-RW transponder reader 92 with an associated RFID Inc. Model 5160 Reader Head antenna 94 (manufactured by RFID Inc., of Aurora, Colo.) embedded within floor 100.

Tray 20 contains no active power source. Power for the passive transponder circuit is generated by the reader antenna 94 exciting an oscillating electromagnetic field at a frequency corresponding with the natural frequency of the tuned transponder antenna 82. The oscillating electromagnetic field from reader antenna 94 causes electrical currents to oscillate in antenna 82 of the on board transponder. Microprocessor chip 70 rectifies this current and converts the energy into a DC voltage current source sufficient to operate microprocessor 70, Upon powering of microprocessor 70, a voltage is applied across parallel switches 76 and 78, in series with resister 74, and a voltage is sensed by the microprocessor sensor pin between resister 74 and switches 76 and 78. In the event switches 76 and 78 are in the open state, thereby indicating that no items are present on tray 20, the voltage sensed is in a high state because no voltage drop across resister 74 has been detected.

However, if at least one switch, 76 or 78, is closed, thereby indicating the presence of an item upon tray 20, the voltage sensed is in a low state because a voltage drop across resister 74 has been detected.

Upon sensing the state of voltage in hard wiring 84, microprocessor 70 will transmit a pre-programmed bit pattern by momentarily grounding, or otherwise disturbing transponder antenna 82 in a predetermined manner thereby modulating the amplitude of the transponder antenna 82 voltage and resulting emitted radio frequency signal amplitude. The bit pattern must be transmitted with a predetermined protocol, such as Manchester, Frequency Shift Keying (FSK), or any other serial data transmission protocol, to allow the reader 92 to properly interpret the data being received from transponder module 46.

Figure 9:
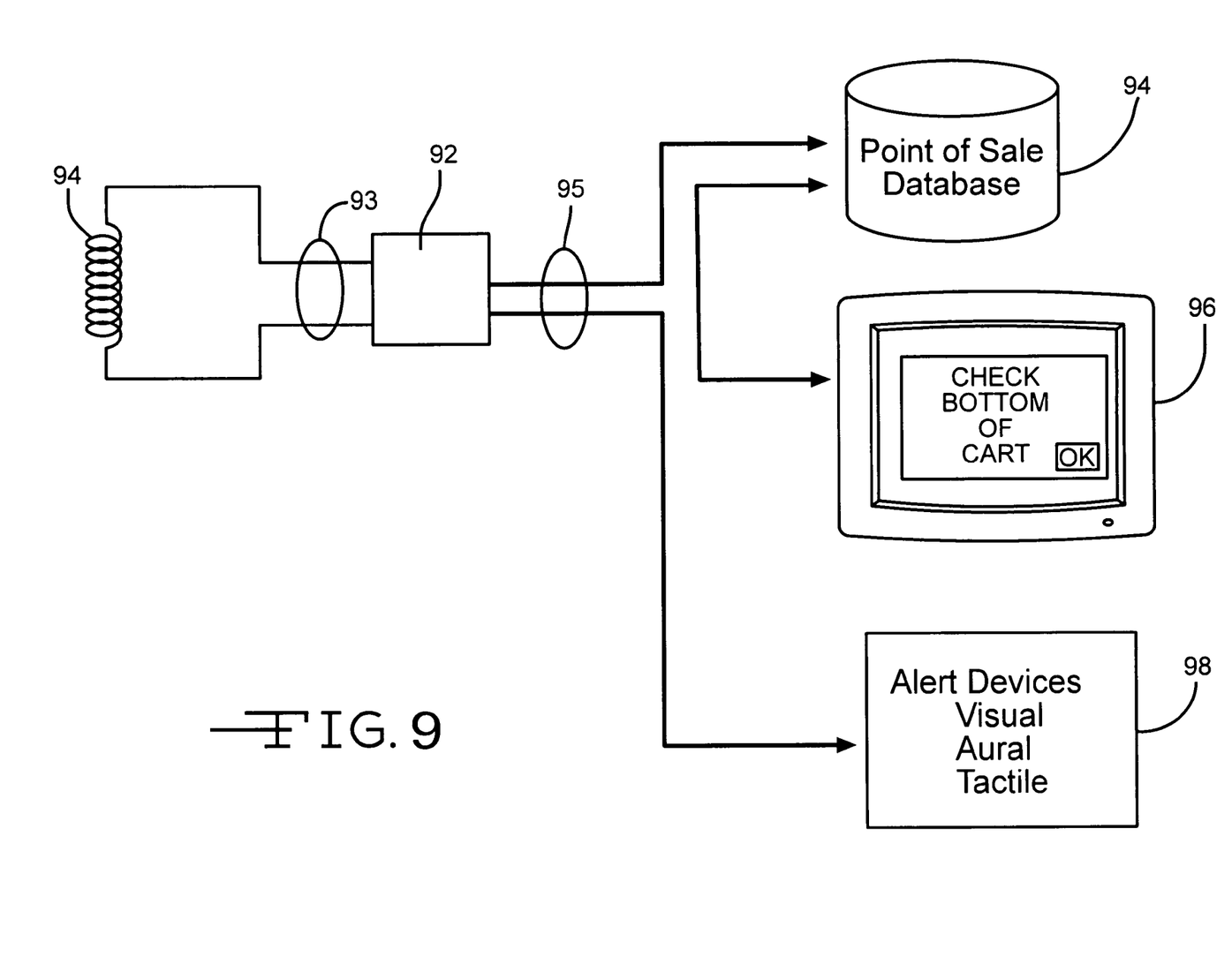
FIG. 9 presents a schematical illustration of a reader system that may be installed at a typical cashier's check out station.

The transponder antenna disturbance and resulting radio frequency signal is sensed by reader antenna 94 and transmitted to reader module 92 through hard wiring 93 and therein converted, by reader module 92, back into the original digital bit pattern. This bit pattern may be further processed by reader module 92 and transmitted through hard wiring 95 to any external system, such as a visual monitor 96, store database 94 or any other suitable alert devise 98.

The preferred location of reader antenna 94, in a retail store application, is embedded in the floor 100 adjacent the cashier's check out stand 26 where customers typically unload the cart as illustrated in FIG. 2. It may be desirable to place a second reader antenna down stream of the first reader antenna 94 to check that an object detected by the first reader antenna had, in fact, been removed. Thus the cashier may be assured that all items have been accounted for before the transaction can be finalized.

The transponder microprocessor 70 is configured to transmit a string of bits to reader 92 when interrogated. The bit pattern transmitted may be configured and stored in the read only memory of microprocessor 70 in any number of ways to allow for identification of the particular grocery cart by a unique serial number, cart manufacturer, state of the weight sensing switches 77 and 79, an/or any other information that may be encoded in a bit stream.

Microprocessor 70 may transmit a pre-programmed bit pattern normally or inverted, depending on the state of weight sensing switches 77 and 79, thus if all switches are in the open condition, indicating that tray 20 is empty, the bit pattern will be transmitted normally. However, if one of the switches 77 or 79 is closed an inverted bit pattern would be transmitted. This feature may provide for self-diagnostics of tray 20. Thus if the cart passes through the detection area and no bit stream is transmitted, the cashier may be alerted to a defective transponder on that particular grocery cart.

It is evident that many alternatives, modifications, and variations of the present invention will be apparent to those skilled in the art in light of the foregoing teachings. Accordingly, the invention is intended to embrace all such alternatives, modifications, and variations as may fall within the spirit and scope of the appended claims.

We claim:

1. A grocery store shopping cart comprising:
   a) a cart structure having a top basket for receiving selected merchandise for purchase,
   b) a bottom tray for receiving additional selected merchandise for purchase, said cart including:
   c) a weight sensing system for sensing the presence of merchandise placed upon said bottom tray,
   d) a transponder system associated with said weight sensing system whereby said transponder system is activated when said weight sensing system senses the presence of merchandise upon said bottom tray, whereby said transponder system transmits a return signal to an interrogating system, when interrogated, indicating that merchandise is present on said bottom tray,
   e) said bottom tray comprising a lattice structure having longeron members and orthogonal members wherein, a transmitting/receiving antenna, for said transponder system, is embedded into selected longeron and orthogonal members of said lattice structure.

2. The shopping cart as claimed in claim 1 wherein said bottom tray includes said weight sensing system incorporated therein.

3. The shopping cart as claimed in claim 2 wherein said shopping cart further includes:
   a) a laterally extending support rod, affixed to the frame of said shopping cart, for supporting the front of said bottom tray, and a laterally extending support bar, affixed to the frame of said shopping cart, for supporting the rear of said bottom tray, wherein said bottom tray further includes:
   1) a front and rear, laterally extending, support member, said support members each comprising an inverted U shaped channel for receiving therein said front support rod and said rear support bar therein,
   2) spring means positioned between said front support member and said front support rod, and between said rear support member and said rear support bar whereby said bottom tray is caused to float above said front support rod and said rear support bar by action of said spring means,
   3) a first electrical on-off, switch associated with said transponder system, and positioned between said front support member and said front support rod such that said on-off switch is activated when said switch contacts said front support rod, thereby activating said transponder system,
   4) a second electrical on-off switch, associated with said transponder system, and positioned between said rear support member and said rear support bar such that said on-off switch is activated when said switch contacts said rear support bar, thereby activating said transponder system.

* * * * *